US007633432B2

(12) United States Patent
Wu

(10) Patent No.: US 7,633,432 B2
(45) Date of Patent: Dec. 15, 2009

(54) METHOD AND APPARATUS FOR PRECISION ANTENNA BORESIGHT ERROR ESTIMATES

(75) Inventor: Yeong-wei A. Wu, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 37 days.

(21) Appl. No.: 11/610,396

(22) Filed: Dec. 13, 2006

(65) Prior Publication Data

US 2008/0143622 A1 Jun. 19, 2008

(51) Int. Cl.
*G01S 13/68* (2006.01)
*G01S 3/56* (2006.01)

(52) U.S. Cl. ........................................ 342/78; 342/158

(58) Field of Classification Search ................ 342/359, 342/74–81, 173–174, 158
See application file for complete search history.

(56) References Cited

U.S. PATENT DOCUMENTS

| | | | | |
|---|---|---|---|---|
| 5,043,737 | A * | 8/1991 | Dell-Imagine | 342/358 |
| 5,133,663 | A * | 7/1992 | Willingham et al. | 434/2 |
| 5,852,792 | A * | 12/1998 | Nielson | 701/222 |
| 6,433,736 | B1 | 8/2002 | Timothy et al. | |
| 6,650,407 | B2 * | 11/2003 | Jamieson et al. | 356/141.1 |
| 7,053,815 | B1 * | 5/2006 | Joynson et al. | 342/62 |
| 2007/0218931 | A1 * | 9/2007 | Beadle et al. | 455/502 |

OTHER PUBLICATIONS

An Improved Conscan Algorithm Based on a Kalman Filter D.B. Eldred TDA Progress Report 42-116 p. 223-231 Feb. 15, 1994.*

Topics regarding 44/20 GHz frequency-hopping communications standards for telemetry, tracking, and commanding (TT&C) Henkle, T.G.; Taggart, D.A.; Military Communications Conference, 1995. MILCOM '95, Conference Record, IEEE vol. 2, Nov. 5-8, 1995 pp. 814-818 vol. 2 Digital Object Identifier 10.1109/MILCOM.1995.483640.*

Gawronski et al, "Three Scanning Techniques for Deep Space Network Antennas to Estimate Spacecraft Position," IPN Progress Report 42-147, Nov. 15, 2001, pp. 1-17.

Gelb et al, "Optimal Linear Filtering", Chapter 4, Applied Optimal Estimation, 1979, 23 pgs.

Olmi et al, "Pointing Large Antennas Using the Conical Scan Technique," Astronomy & Astrophysics Supplement Series 129, Apr. 1, 1998, pp. 177-189.

* cited by examiner

*Primary Examiner*—Thomas H Tarcza
*Assistant Examiner*—Cassi Galt
(74) *Attorney, Agent, or Firm*—Lee & Hayes, PLLC

(57) ABSTRACT

Methods, systems and devices are disclosed for positioning an antenna having a sub-reflector assembly. A conical scan processor receives a period for a reference time pulse and a time tag. The processor calculates a rotation angle of the sub-reflector assembly using the received period for the reference time pulse and the received time tag. The processor may also receive a power measurement associated with the time tag. The processor may calculate and then output antenna boresight errors based on the calculated rotation angle of the sub-reflector assembly and the power measurements associated with the time tag.

21 Claims, 16 Drawing Sheets

METHOD AND APPARATUS FOR PRECISION ANTENNA BORESIGHT ERROR ESTIMATES

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract Number FAB-T F19628-02-C-0048 awarded by Electorinic Systems Center, Air Force Material Command, USAF.

BACKGROUND OF THE INVENTION

1. Field of the Invention

The invention relates to methods, equipment and systems used to align antennas or laser communication equipment and, more particularly, to methods, equipment and systems used to obtain precision boresight error estimates and using these estimates to align antennas or laser communication equipment.

2. Description of the Related Art

Systems, equipment and methods have been developed to align an antenna's boresight. Some of these methods or algorithms estimate the antenna boresight error. However, these methods or algorithms are limited to the specific gimbaled antenna system for which the method or algorithm was developed. Consequently, they can not be easily adopted or modified from one system to another.

Details of such methods or algorithms are disclosed in U.S. Pat. No. 6,433,736 B1, and also in "Pointing large antennas using the conical scan technique", L. Olmi and M. M. Davis, Astronomy & Astrophysics Supplement Series, 129, pp. 177-189, 1998. These references are herein incorporated by reference.

Accordingly, there is a need for a generic boresight error estimation algorithm or method that can be used for various gimbaled antenna precision pointing systems or laser communication pointing, acquisition, and tracking systems.

BRIEF SUMMARY OF THE INVENTION

The present invention addresses the problems identified above by providing methods, equipment and systems that provide or use a generic boresight error estimation algorithm or method that can be used for a variety of applications, including gimbaled antenna precision pointing systems, and laser communication pointing, acquisition, and tracking systems.

The disclosed antenna boresight error estimation algorithms, using the received power signals, are derived based on a power sensitivity method (power sensitivity to the antenna boresight errors), which is different from the existing curve-fitting method (a method to fit the antenna pattern). This new method leads to a 3-state Kalman filtering solution, which directly estimates the antenna boresight errors (azimuth and elevation angle errors). The resultant solution or algorithm can be applied to any type of antennas (e.g. circular or elliptical), and to any scan patterns, including CONSCAN pattern or fixed-point pattern used to create filter observability.

In one embodiment, a method is disclosed for positioning an antenna having a sub-reflector assembly. The method includes: receiving a period for a reference time signal or pulse; receiving a time tag; and calculating a rotation angle of the sub-reflector assembly using the received period for the reference time pulse and the received time tag.

The method may also include: receiving a power measurement associated with the time tag; calculating an antenna boresight error based on the calculated rotation angle of the sub-reflector assembly and the power measurement associated with the time tag; and outputting the calculated antenna boresight error.

In another embodiment, a system is also disclosed for positioning an antenna having a sub-reflector assembly. The system may include a conical scan processor that receives a period for a reference time pulse, a time tag and a power measurement associated with the time tag. The processor calculates a rotation angle of a sub-reflector assembly using the period for the reference time pulse and the time tag, and also calculates and then outputs a signal representing the antenna boresight error based on the calculated rotation angle and the power measurement associated with the time tag.

The system may also include: an antenna including a sub-reflector assembly; and a MODEM in a communication system with the sub-reflector assembly and the conical scan processor, wherein the MODEM communicates the period for the reference time pulse, the time tag and the power measurement associated with the time tag to the conical scan processor. The MODEM also communicates the reference time pulse to the sub-reflector assembly.

In a further embodiment, a device is disclosed for positioning an antenna having a sub-reflector assembly. The device includes: receiving means for receiving a period for a reference time pulse; receiving means for receiving a time tag; and calculating means for calculating a rotation angle of the sub-reflector assembly using the received period for the reference time pulse and the received time tag.

The device also may include: receiving means for receiving a power measurement associated with the time tag; calculating means for calculating an antenna boresight error based on the calculated rotation angle of the sub-reflector assembly and the received power measurement associated with the time tag; and outputting the calculated antenna boresight error.

BRIEF DESCRIPTION OF THE DRAWINGS

The accompanying drawings incorporated in and forming part of the specification illustrate several aspects of the present invention. In the drawings.

Reference will now be made in detail to embodiments of the invention, examples of which are illustrated in the accompanying drawings.

DETAILED DESCRIPTION

The term antenna, as used herein, shall include electromagnetic (e.g., light, radio, radar or microwave) and sound antennas or similar devices used to transmit and receive electromagnetic and sound waves. Antennas that are used to receive light may be also called optical antennas. Optical antennas may be used as part of laser communication systems.

Figure 1:
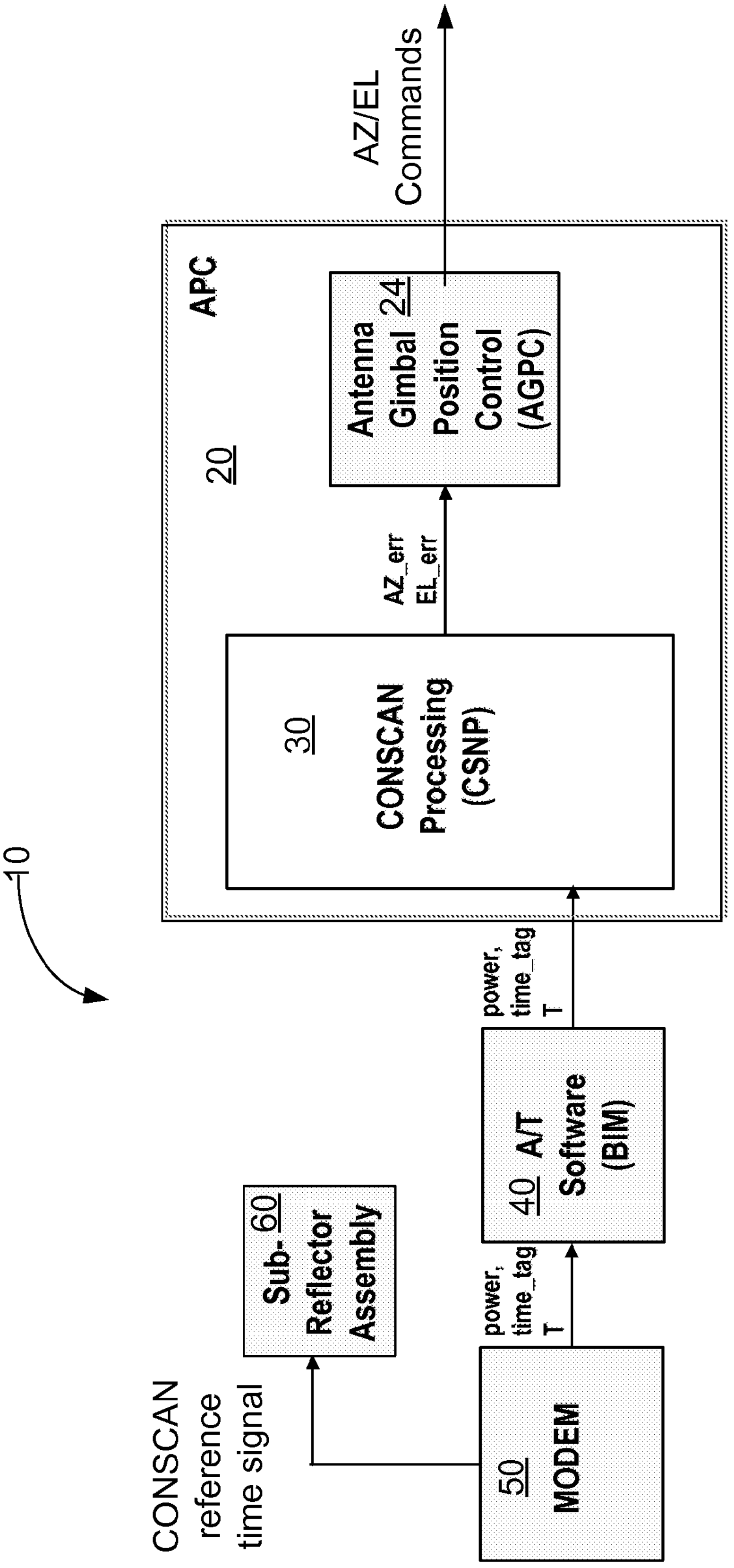
FIG. 1 illustrates an exemplary block diagram of an antenna boresight alignment system that includes conical scan (CONSCAN) processing (CSNP).

FIG. 1 illustrates one embodiment of an antenna boresight alignment system 10. The system 10 includes an antenna position control (APC) 20. The APC 20 is in communication with a MODEM 50. The MODEM 50 also communicates with an antenna sub-reflector assembly 60. Some embodiments of alignment system 10 may include an acquisition and tracking process 40. The acquisition and tracking process 40, if included, typically acts as a relay between the MODEM 50 and the APC 20.

In the illustrated embodiment, the APC 20 includes a conical scan (CONSCAN) processing (CSNP) system 30 and may include an antenna gimbal position control (AGPC) 24. In some embodiments the conical scan (CONSCAN) processing (CSNP) system 30 and an antenna gimbal position control (AGPC) 24 may be integrated into a single device. In other embodiments the CSNP system 30 and the AGPC 24 may be separate devices or systems.

At the beginning of a conical scan, the MODEM 50 sends a CONSCAN reference time pulse to antenna sub-reflector assembly 60. Typically, the MODEM 50 commands the antenna sub-reflector 60 to rotate at a constant rate (from 1.5 Hz to 12.5 Hz). The MODEM 50 measures the received powers during the conical scan. In one embodiment, the MODEM 50 measures the received powers from the (random) frequency hopped RF signals during the conical scan, and sends the measured powers with their time tags with respect to the conical scan reference time pulse to the APC 20. The MODEM 50 also sends the period, T, of the conical scan reference time pulse to APC 20.

The CSNP 30 uses the measured power with its time tag and the period T to calculate the azimuth error (AZ_err) and the elevation error (EL_err). These error signals are provided to the AGPC 24. The AGPC 24 uses the azimuth error (AZ_err) and the elevation error (EL_err) to adjust the torque commands to the gimbals that position the antenna and thus adjust the antenna's bore sight.

Figure 2:
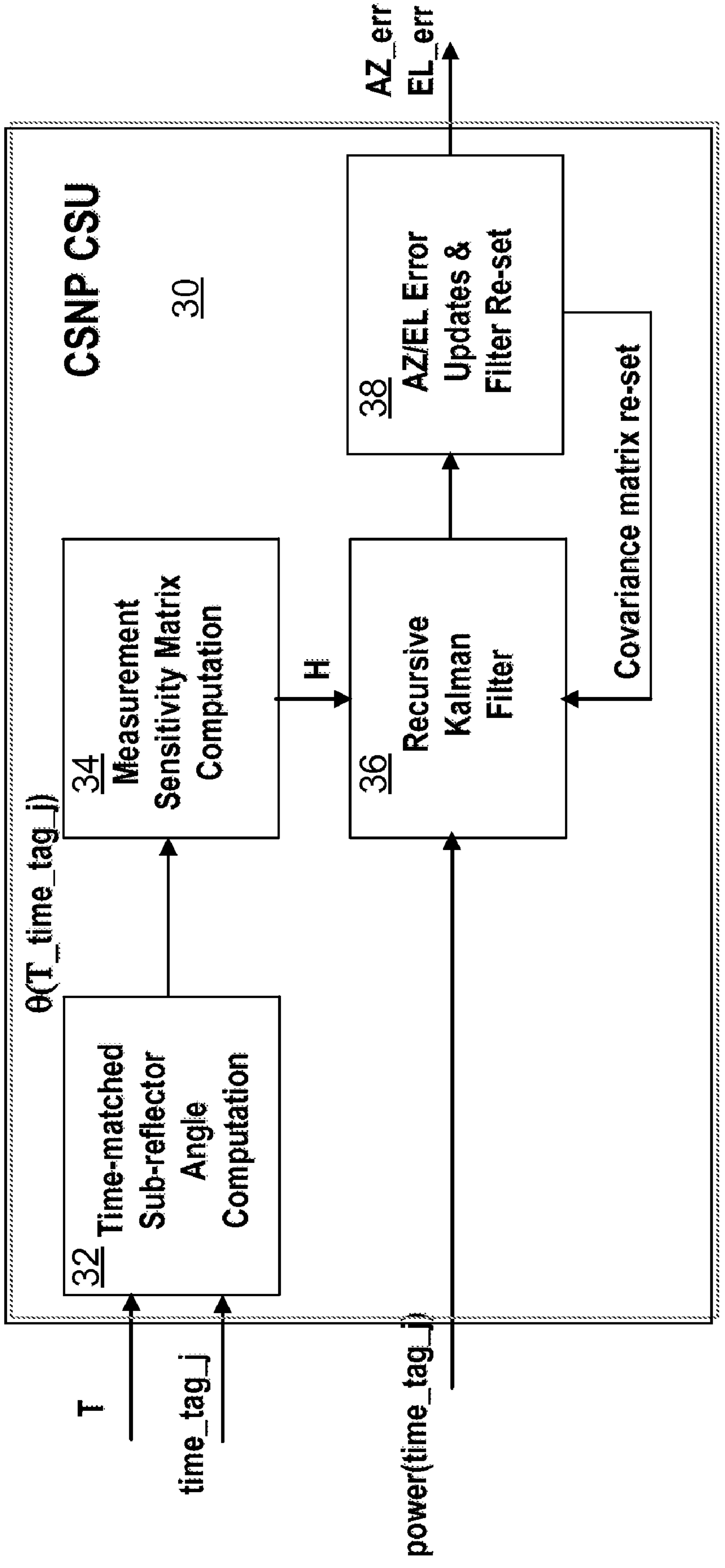
FIG. 2 illustrates an exemplary block diagram for conical scan (CONSCAN) processing (CSNP) show in FIG. 1.

FIG. 2 illustrates one embodiment of the processes that may be employed by the CSNP 30. In this embodiment, the CSNP 30 generates the time-matched sub-reflector angles (θ(T_time_tag_j)) using the time-tag (time_tag_j) and period T data provided by the MODEM 50 in block 32. Then the CSNP 30 estimates the antenna line-of-sight azimuth and elevation angle errors or offsets using the computed sub-reflector angles (θ(T_time_tag_j)) and sync-hopped powers (power(time_tag_j) provided by the MODEM 50 in blocks 34, 36, and 38. In one embodiment this data is provided during the spatial fine track mode used by existing antenna systems.

Some embodiments are required to maintain less than 1 dB degradation from the peak power. In these embodiments, the AZ and EL errors (the antenna boresight error) should be less than +−0.05 degree during the conical scan in order to meet the 1 dB requirement. Other embodiments may allow smaller or larger errors.

The embodiment of the CSNP shown in FIG. 2 includes the following computation components: time-matched sub-reflector angle computation processing in block 32; measurement sensitivity matrix computation processing in block 34; recursive Kalman filter processing in block 36; and AZ/EL error updates and covariance matrix reset in block 38. In other embodiments blocks 34, 36, and 38 may be replaced by any alternative process that can be used to calculate the azimuth and elevation errors based on the sub-reflector angle that may be calculated in block 32, for example, and the power output from MODEM 50. Examples of such a process include: least squares filter; recursive least squares filter; fixed gain filter; etc.

In some embodiments, the CSNP 30 may be software or code stored in memory and executed on a computer, a processor or CPU. The memory may be any suitable type of memory including, for example, ROM, RAM, magnetic, optical, etc. The computer may be a specialized or general purpose computer. Similarly, the processor or CPU may be a specialized or general purpose device. In other embodiments the CSNP may be hardware. An ASIC is one example of hardware that may be used as CSNP 30.

Figure 3:
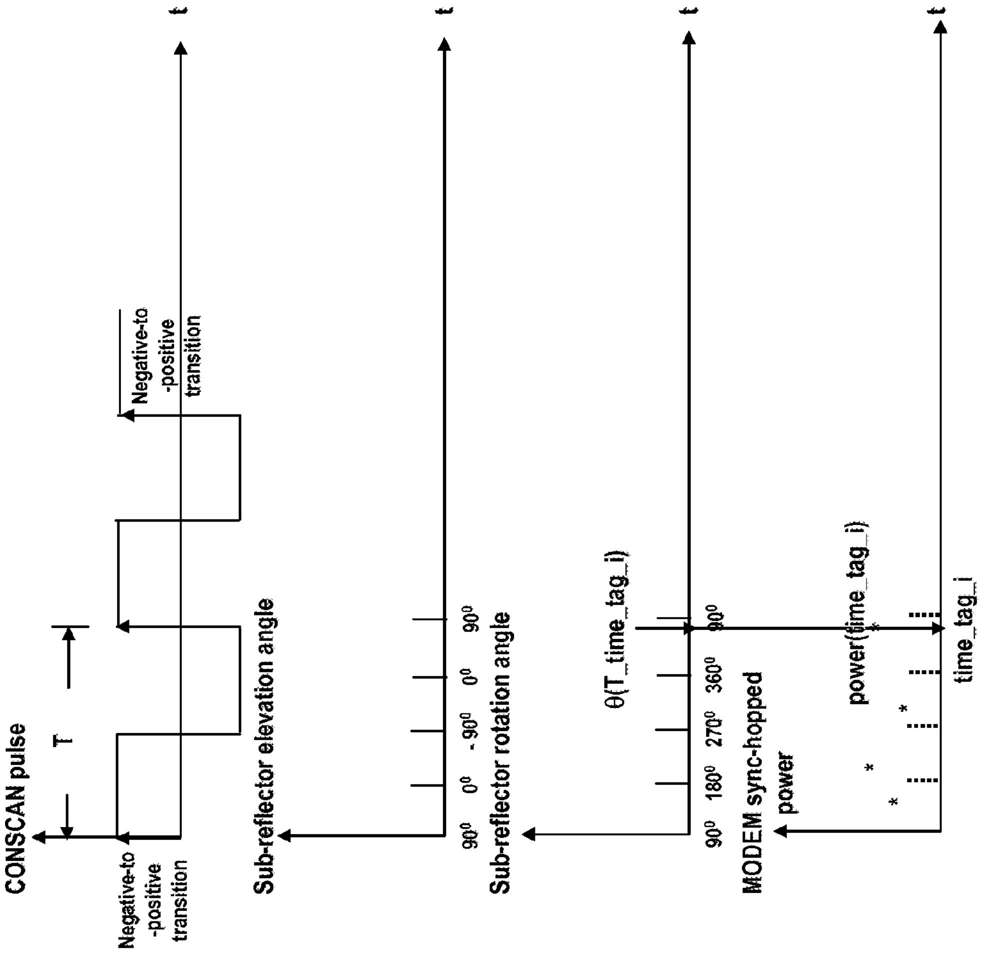
FIG. 3 shows on example of Time-matched sub-reflector angle computation.

FIG. 3 illustrates one example of the results of the time-matched sub-reflector angle computation processing. This processing may generate the time-matched sub-reflector angle (θ(T_time_tag_i)) with the time_tag (time_tag_i) and period T output by the MODEM 50 for each power measurement (power(time_tag_i)).

Figure 4:
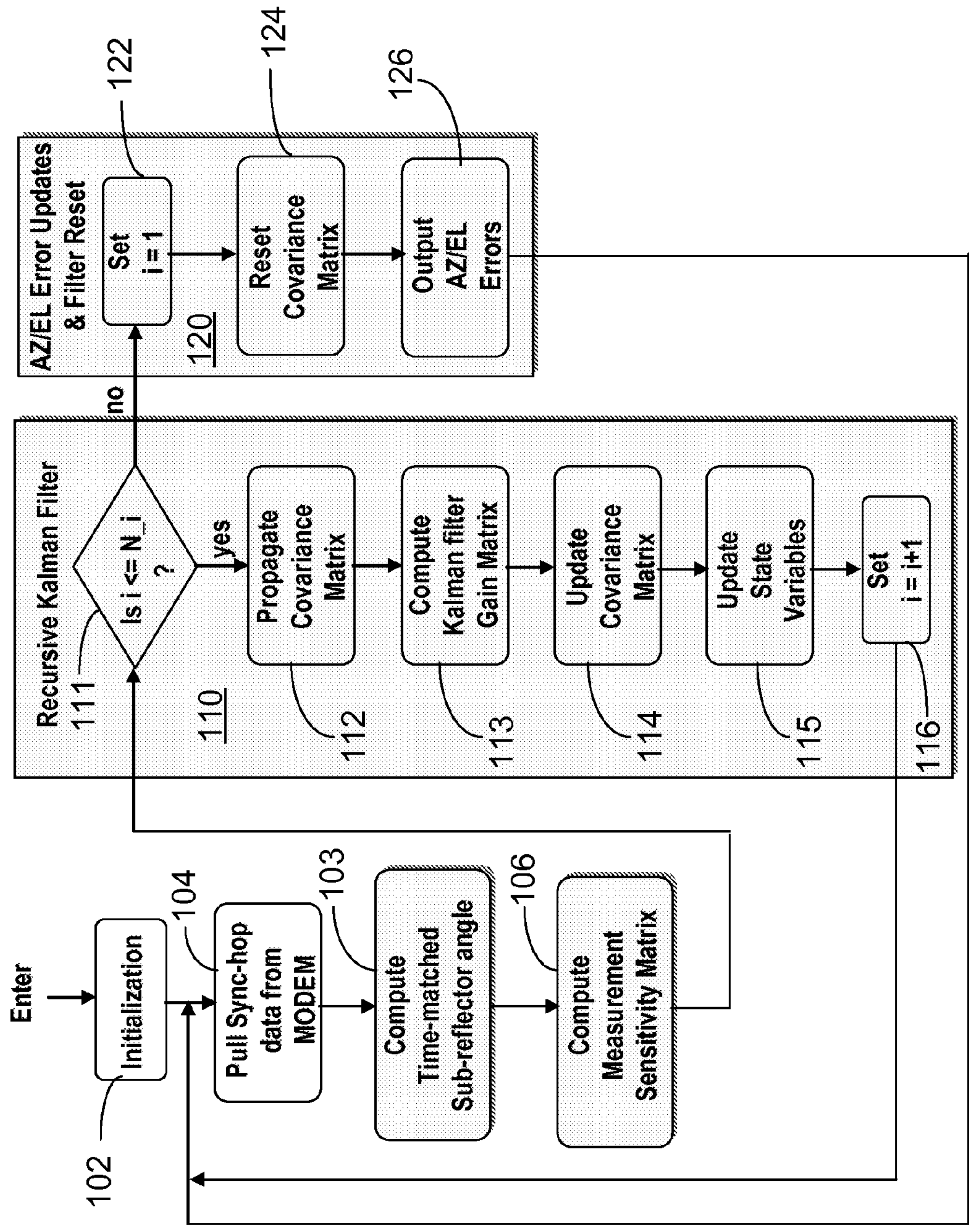
FIG. 4 illustrates an exemplary CSNP process flow diagram that may be used in the CSNP processing shown in FIG. 2.

FIG. 4 provides a process flow chart that illustrates one embodiment of the CSNP 30 processing shown in FIG. 2. The illustrated process begins by initialization of the software at step 102. This initialization may include defining and/or initializing variables. The initialization step 102, if used, will depend on the programming environment and the operating system or environment.

In step 103, the CSNP 30 receives, retrieves or pulls data from MODEM 50. In the illustrated embodiment the data is sync-hop data that includes power measurement (power (time_tag_i)); CONSCAN reference signal period T; and time_tag_i.

In step 104 the time matched sub-reflector angle (θ(T_time_tag_i)) is calculated from the time_tag_i and period T. In one embodiment, the time matched sub-reflector angle (θ(T_time_tag_i)) is calculated as follows:

Step 1: compute a T-modular time-tag (T_time_tag_i) using equations (1) and (2).

$$N=\text{integer}(\text{time\_tag\_}i/T) \quad (1)$$

$$T\text{\_time\_tag\_}i=\text{time\_tag\_}i-N*T \quad (2)$$

Step 2: compute time-matched sub-reflector angle, θ(T_time_tag_i) using equation (3).

$$\theta(T\text{\_time\_tag\_}i)=\pi/2+T\text{\_time\_tag\_}i*(2\pi/T) \quad (3)$$

In step 106 a measurement sensitivity matrix may be calculated. This matrix prepares, conditions, or converts the time-matched sub-reflector angle, θ(T_time_tag_i) into a form that can be used in the Kalman filter shown in step 110. If a Kalman filter is not used and an alternative process is used, then the measurement sensitivity matrix may not be used and step 106 omitted or the measurement sensitivity matrix modified to prepare, condition, or convert the time-matched sub-reflector angle, θ(T_time_tag_i) into a form suitable for the alternative process selected.

In one embodiment, the measurement sensitivity matrix H may be calculated using equations (4)-(8).

$$AZ_m = a*\cos(\theta(T\_time\_tag\_i)) \quad (4)$$

$$EL_m = a*\sin(\theta(T\_time\_tag\_i)) \quad (5)$$

$$H(1,1)=1 \quad (6)$$

$$H(1,2)=\text{scale}\_AZ*AZ_m \quad (7)$$

$$H(1,3)=\text{scale}\_EL*EL_m \quad (8)$$

where scale_AZ is a scale factor converting AZ power into AZ radian;

scale_EL is a scale factor converting EL power into EL radian; and a is the sub-reflector offset angle in radians.

In block 110 a recursive Kalman filter is used to calculate the azimuth and elevation errors. Other embodiments may use alternatives to the recursive Kalman filter to calculate the errors. These alternatives may include: least-squared filter; recursive least-squared filter; or fixed-gain filter.

In the embodiment shown in FIG. 4, the recursive Kalman filter computation checks to see if an index value is less that or equal to a predetermined number N_i at step 111. The predetermined number N_i is the number of samples for the Kalman updates. The predetermined number N_i should be at least four. A larger predetermined number N_i reduces the errors in the output values for the antenna azimuth and elevation error. However, a large predetermined number N_i increases the time taken to process the Kalman filter and change the antenna position or faster (more expensive) processing equipment is required. In one embodiment, N_i is equal to 8. In other embodiments the computation may check to see if the index value is larger than a predetermined number. In some embodiments this step may be the last or next to last step. In other embodiments this step may be performed at a convenient time in the recursive Kalman filter process.

In the embodiment shown in FIG. 4, if the index value in step 111 is less than or equal to the predetermined number then the process flow moves to step 112. In step 112 a covariance matrix, P_p(time_tag_i), may be propagated or calculated. In one embodiment the covariance matrix, P_p(time_tag_i), may be propagated or calculated using equation (9).

$$P\_p(\text{time\_tag\_i}) = P\_p(\text{time\_tag\_i}-1) + Q*(\text{time\_tag\_i} - \text{time\_tag\_i}-1) \quad (9)$$

where $$Q = \begin{bmatrix} q11 & 0 & 0 \\ 0 & q22 & 0 \\ 0 & 0 & q33 \end{bmatrix}; \text{ and}$$

where q11 is process noise covariance of the first state variable;

q22 is Process noise covariance of the second state variable; and q33 is process noise covariance of the third state variable.

In step 113, a Kalman filter gain matrix, $K_c$ may be calculated. In one embodiment the Kalman filter gain matrix, $K_c$ may be calculated using equation (10).

$$K_c = P\_p(\text{time\_tag\_i})*H^T*(H*P\_p(\text{time\_tag\_i})*H^T+R)^{-1} \quad (10)$$

where P_p(time_tag_i) is the covariance matrix;

H is the measurement sensitivity matrix;

$H^T$ is the transpose of measurement sensitivity matrix, H;

R is the noise covariance.

In step 114, the covariance matrix, P_p(time_tag_i) may be updated. In one embodiment the covariance matrix, P_p (time_tag_i) may be calculated using equation (11).

$$P(\text{time\_tag\_i}) = (I_{3X3} - K_c*H)*P\_p(\text{time\_tag\_i}-1) \quad (11)$$

where $I_{3\times3}$ is a 3×3 identity matrix;

$K_c$ is a Kalman filter gain matrix given by equation (10); and

H is the measurement sensitivity matrix.

In step 115, the state estimate variables, xhat(time_tag_i) may be updated. In one embodiment the state estimate variables, xhat(time_tag_i) may be updated using equations (12) and (13).

$$xhat(\text{time\_tag\_i}) = xhat(\text{time\_tag\_i}-1) + K_C*\{\text{power\_}y_C - H*xhat(\text{time\_tag\_i}-1)\} \quad (12)$$

$$\text{power\_}y_C = V_0\{1-(\text{scale\_power}*\text{scale}^2*a^2)/4\} - \text{power}(\text{time\_tag\_i}) \quad (13)$$

where $K_C$ is the Kalman filter gain matrix;

H is the measurement sensitivity matrix;

$V_0$ is a conversion factor;

scale_power is a constant for scaling the power scale is a scale factor characterizing the antenna parameters;

a is the sub-reflector offset angle in radians; and power(time_tag_i) is the sync-hopped powers provided by the MODEM 50 at time_tag_i In step 116 the index value may be incremented. In some embodiments this step may be the last step of the recursive Kalman filter process, as shown in FIG. 4. In other embodiments this step may be performed at a convenient time in the recursive Kalman filter process. This step may even be the first or second step of the process.

In the embodiment shown in FIG. 4, after each pass through the Kalman filter (step 110), the process returns to step 103.

When the index value is larger than the predetermined value, then the process moves from block 110 to block 120. In block 120 the Kalman filter is reset and the azimuth and elevation errors are output. Typically, the azimuth and elevation errors are output to the AGPC 24.

In step 122 the index value may be reset to 1. In step 124 the covariance matrix, P_p(time_tag_i) may be reset to the initial covariance matrix, P_p(time_tag_0). In one embodiment, the initial covariance matrix, P_p(time_tag_0) is shown in equation (14).

$$P\_p(time\_tag\_0) = \begin{bmatrix} p11 & 0 & 0 \\ 0 & p22 & 0 \\ 0 & 0 & p33 \end{bmatrix} \quad (14)$$

where p11 is an initial error covariance of the first state variable;

p22 is an initial error covariance of the second state variable; and p33 is an initial error covariance of the third state variable.

In step 126 the azimuth and elevation errors may be output. In one embodiments these errors are found using equations (15) and (16).

$$AZ\_err = xhat(\text{time\_tag\_}i, 2) = \text{second component of } xhat \quad (15)$$

$$EL\_err = xhat(\text{time\_tag\_}i, 3) = \text{third component of } xhat \quad (16)$$

Figure 5:
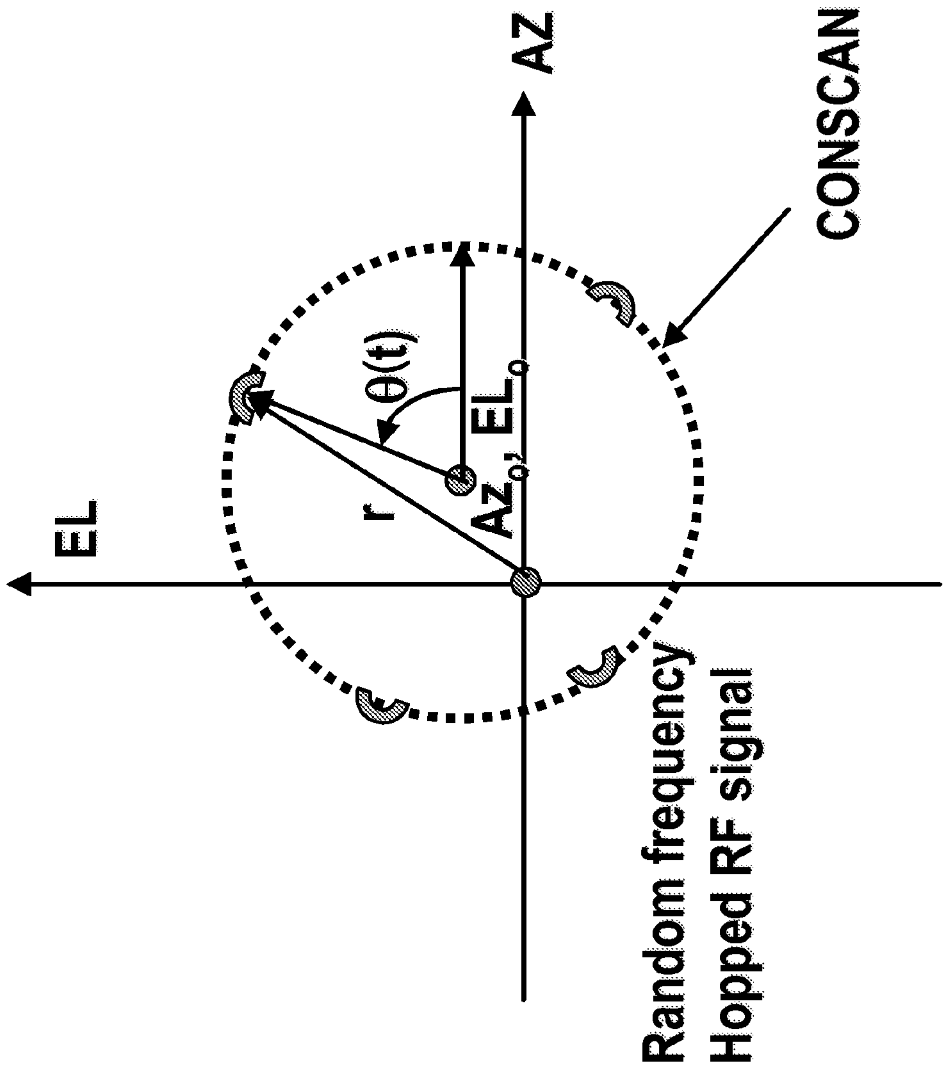
FIG. 5 shows an example on the relationship over time between the sub-reflector and the antenna boresight.

In one embodiment for a circular antenna, the Kalman filter may be developed for legacy or existing antenna by assuming that the current antenna boresight is located at AZ0, EL0, as shown in FIG. 5, then the received power of a sync-hopped RF signal is given by equations (17)-(20).

$$\text{power} = V_o\left\{2.0\left(\frac{J_1(\text{u\_r})}{\text{u\_r}}\right)\right\}^2 \quad (17)$$

$$\text{u\_r} = \frac{\pi D}{\lambda}\sin(r) \quad (19)$$

$$\lambda = \frac{c}{f} \quad (20)$$

where r is the distance from the Rx beam center;

$J_1(.)$ is a Bessel function of the first kind;

Vo is a conversion factor;

D is the diameter of antenna;

f is the wavelength of the Rx (received) sync-hopped signal; and c is the speed of light.

The distance r, can be expressed as shown in equation (21).

$$r^2 = (AZ_m + AZ_o)^2 + (EL_m + EL_o)^2 \quad (21)$$

with $AZ_m(t) = a*\cos(\theta(t))$;

$EL_m(t) = a*\sin(\theta(t))$; and $\theta(t) = 2\pi f_s t$, where $f_S$ is the CONSCAN frequency in Hz.

For a small r, the received power can be approximated as shown in equations (22)-(24).

$$\begin{aligned} \text{power} &= V_o\left\{2.0\left(\frac{J_1(\text{u\_r})}{\text{u\_r}}\right)\right\}^2 \quad (22) \\ &= V_o\left\{2.0\left(\frac{\frac{\text{u\_r}}{2} - \frac{(\text{u\_r})^3}{16} + \frac{(\text{u\_r})^5}{384} - \dots}{\text{u\_r}}\right)\right\}^2 \\ &\approx V_o\left\{1 - \frac{(\text{u\_r})2}{4}\right\} \quad (23) \\ &\approx V_o\{1 - (\text{scale\_r})r^2\} \end{aligned}$$

with

-continued $$\text{scale\_r} = \left(\frac{\pi D}{2\lambda}\right)^2 = \frac{(\text{scale})^2}{4} \quad (24)$$

The variable, $y(t_i)$, is defined as shown in equation (25).

$$y(t_i) = V_o - \text{power}(t_i) - V_o(\text{scale\_}r)a^2 \approx V_o(\text{scale\_}r)(r^2 - a^2) \quad (25)$$

Equation (26) or (27) is obtained by substituting equation (21) into equation (25).

$$y(t_i) = V_0(\text{scale\_}r)\{AZ_0^2 + EL_0^2 + (2AZ_m(t_i))AZ_0 + (2EL_m(t_i))EL_0\}; \text{ or} \quad (26)$$

$$y(t_i) = x1 + c1(t_i)x2 + c2(t_i)x3 + n(t_i) \quad (27)$$

where $x_1 = V_0(\text{scale\_r})*\{AZ_0^2 + EL_0^2\}$;

$x_2 = AZ_0$;

$x_3 = EL_0$;

$c_1(t_i) = \text{scale\_AZ}*AZ_m(t_i)$;

$c_2(t_i) = \text{scale\_EL}*EL_m(t_i)$;

$\text{scale\_AZ} = 2*V_0*\text{scale\_r}$;

$\text{scale\_EL} = 2*V_0*\text{scale\_r}$; and $n(t_i)$ represents the measurement error and the truncation error.

When the 3×1 state vector, x, is defined as shown in equation (28) and the 1×3 measurement sensitivity matrix H is defined as show in equation (29) (or equations (6) through (8), then, the measurement equation is shown in equation (30).

$$x = \begin{bmatrix} x_1 \\ x_2 \\ x_3 \end{bmatrix} \quad (28)$$

$$H = [1 \ c_1 \ c_2] \quad (29)$$

$$y(t_i) = Hx + n(t_i) \quad (30)$$

Since the state variables are all constants, their dynamic equations are follows:

$$\begin{bmatrix} xdot_1 \\ xdot_2 \\ xdot_3 \end{bmatrix} = \begin{bmatrix} 0 & 0 & 0 \\ 0 & 0 & 0 \\ 0 & 0 & 0 \end{bmatrix}\begin{bmatrix} x_1 \\ x_2 \\ x_3 \end{bmatrix} + \begin{bmatrix} \omega_1 \\ \omega_2 \\ \omega_3 \end{bmatrix} \quad (31)$$

where $\omega_1$, $\omega_2$, and $\omega_3$ are the added process noises.

Based on equations (30) and (31), the recursive Kalman filter can be obtained as shown in FIG. 4.

In another embodiment, the Kalman filter may be derived for an airborne antenna with elliptical antenna beam pattern. For an elliptical antenna beam, the normalized Gaussian antenna power pattern may be shown in equation (32).

$$P_n(EL, AZ) = e^{-k_{EL}EL^2} e^{-k_{AZ}AZ^2} \quad (32)$$

where $k_{EL} = \frac{\pi D_{EL}}{8\lambda}$;

$k_{AZ} = \frac{\pi D_{AZ}}{8\lambda}$; and where $D_{EL}$ is the effective diameter in the EL direction; and $D_{AZ}$ is the effective diameter in the AZ direction.

The resultant power is given by equation (33).

$$\text{power} = V_o\left\{2.0\left(\frac{J_1(\text{u\_r})}{\text{u\_r}}\right)\right\}^2 \tag{33}$$

$$\text{with u\_r} = \left(\frac{\pi D_{AZ}}{\lambda}\right)\sin(r)$$

$$r = \sqrt{AZ^2 + \left(\frac{D_{EL}}{D_{AZ}}\right)EL^2}$$

It is noted that if $D_{EL}=D_{AZ}$, the above equations reduce to equations used in the circular antenna example.

Similarly, the received power can be approximated by equations (34) and (35).

$$\text{power} = V_o\left\{2.0\left(\frac{J_1(\text{u\_r})}{\text{u\_r}}\right)\right\}^2 \approx V_o\{1 - (\text{scale\_r})r^2\} \tag{34}$$

$$\text{scale\_r} = \left(\frac{\pi D_{AZ}}{2\lambda}\right)^2 \tag{35}$$

The distance, r, in this case, is given by equation (36).

$$r^2 = (AZ_m + AZ_o)^2 + \left(\frac{D_{EL}}{D_{AZ}}\right)(EL_m + EL_o)^2 \tag{36}$$

where $AZ_m$ and $EL_m$ are the known AZ/EL angles with respect to the antenna boresight location, $AZ_0$ and $EL_0$.

Figure 6:
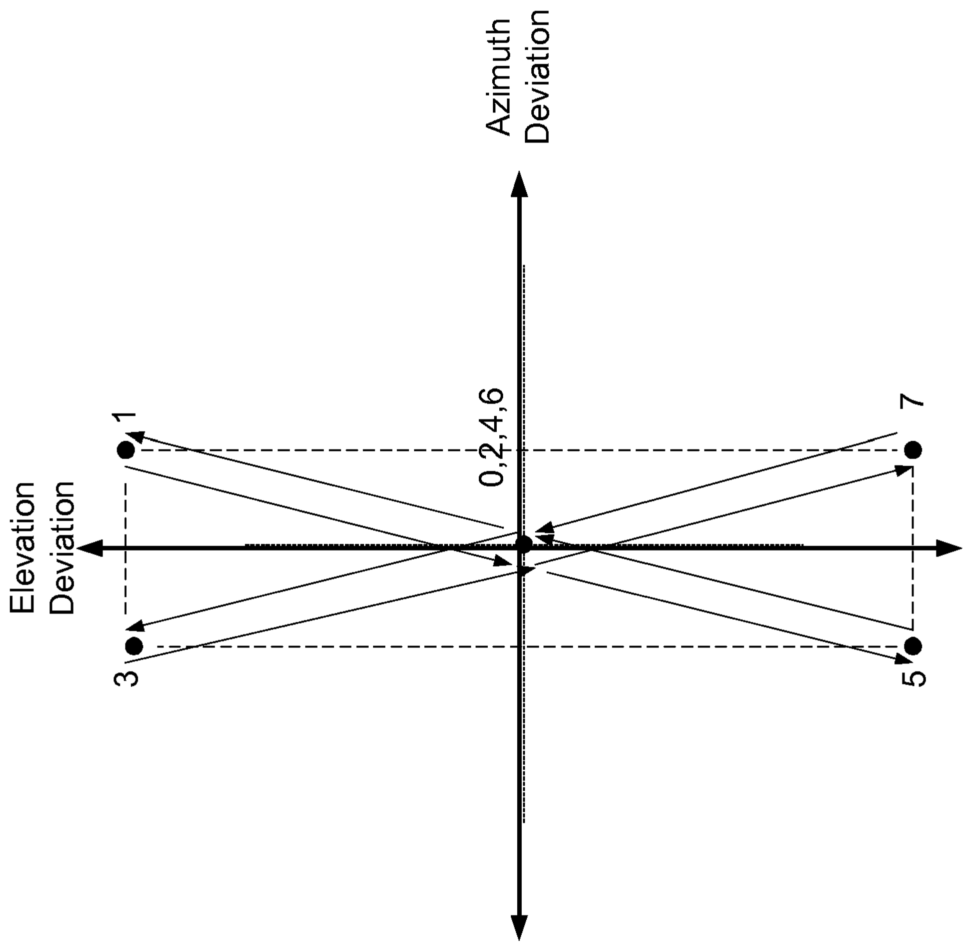
FIG. 6 shows an example of an eight-point "starfish" data collection pattern.

Some embodiments may use a self scan operation. One examples of a self-scam pattern is shown in FIG. 6. At location i, (i from 1 through 8) a measurement signal, $y(t_i)$ is generated using the received sync-hopped power from the MODEM 50. One representation of signal, $y(t_i)$, may be shown in equations (37) and (38).

$$y(t_i) = V_o - \text{power}(t_i) - V_o(\text{scale\_r})\left(AZ_{mi}^2 + \left(\frac{D_{EL}}{D_{AZ}}\right)EL_{mi}^2\right) \tag{37}$$

$$= x_1 + c_1(t_i)x_2 + c_2(t_i)x_2 \tag{38}$$

where $$x_1 = V_o(\text{scale\_r})\left\{AZ_o^2 + \left(\frac{D_{EL}}{D_{AZ}}\right)EL_o^2\right\}$$

$$x_2 = AZ_o$$

$$x_3 = EL_o$$

$$c_1(t_i) = 2V_o(\text{scale\_r})AZ_m(t_i)$$

$$c_2(t_i) = 2V_o(\text{scale\_r})\left(\frac{D_{EL}}{D_{AZ}}\right)EL_m(t_i)$$

$$\text{scale\_AZ} = 2 * V_0 * \text{scale\_r}$$

$$\text{scale\_EL} = 2 * V_0 * \text{scale\_r}$$

Hence, the Kalman filtering used for the legacy CONSCAN operation can be applied to the airborne antenna with elliptical antenna beam pattern during self-scan operation. The state equation is shown in equation (39) and the measurement equations are shown in equations (40) and (41).

$$\begin{bmatrix}\dot{x}_1\\ \dot{x}_2\\ \dot{x}_3\end{bmatrix} = \begin{bmatrix}0&0&0\\0&0&0\\0&0&0\end{bmatrix}\begin{bmatrix}x_1\\x_2\\x_3\end{bmatrix} + \begin{bmatrix}\omega_1\\ \omega_2\\ \omega_3\end{bmatrix} \tag{39}$$

$$y(t_i) = H\vec{x} + n(t_i) \tag{40}$$

$$H = [1\ c_1\ c_2] \tag{41}$$

Figure 7:
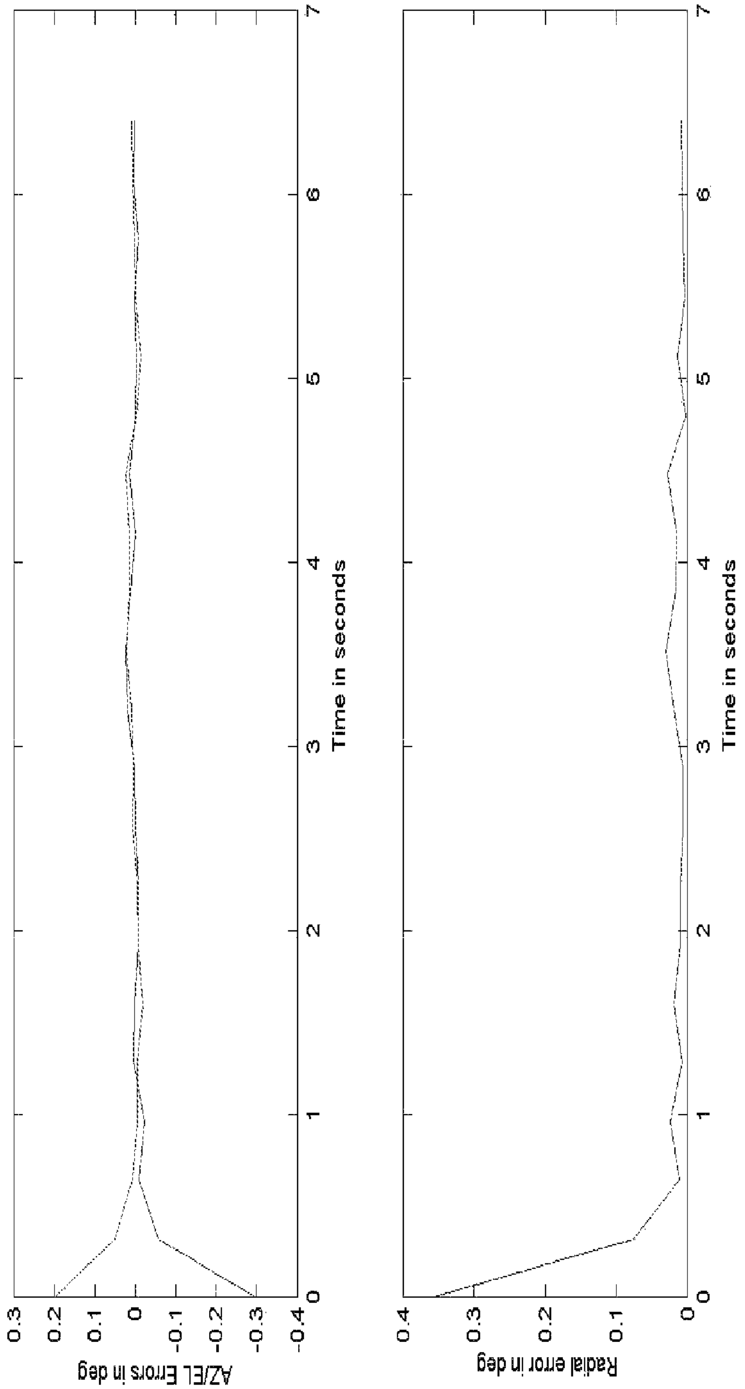
FIG. 7 shows a sample of AZ/EL errors (upper plots) and radial error (lower plot) in degrees over time.
Figure 8:
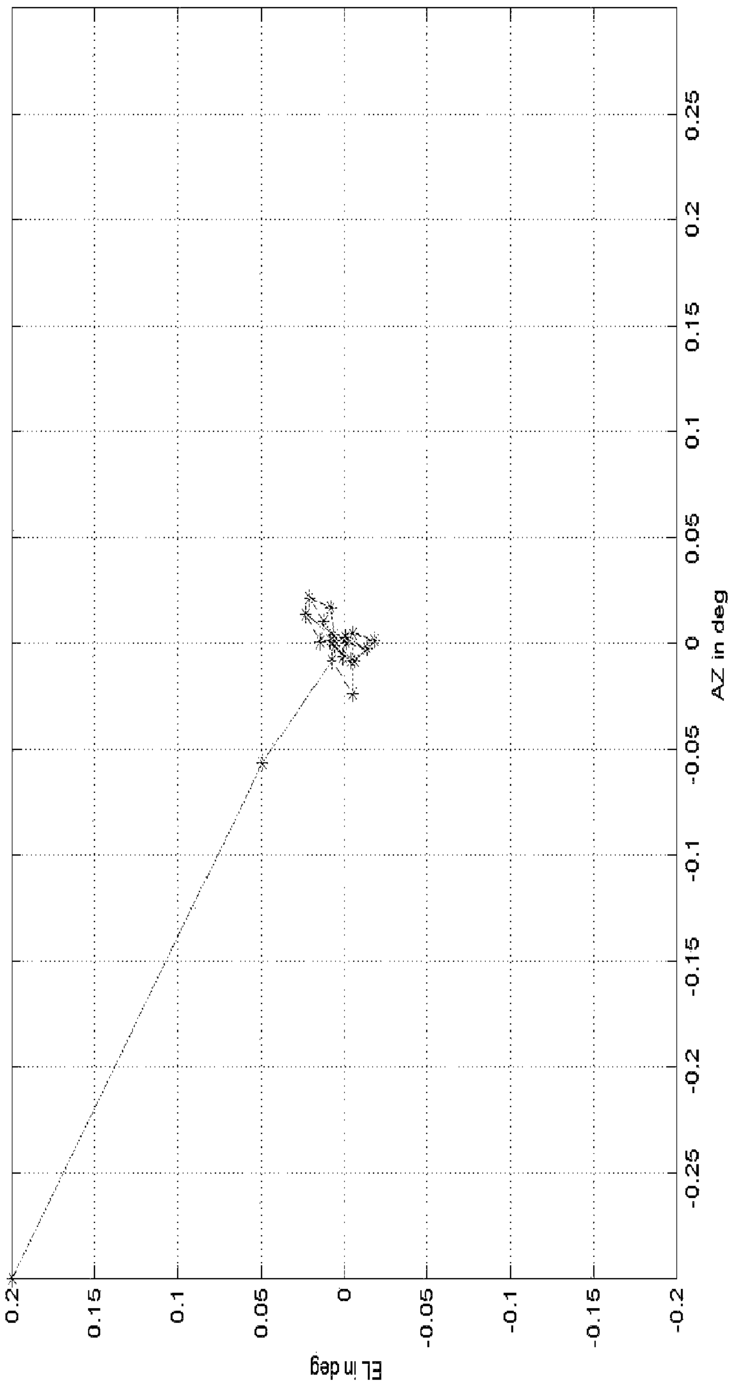
FIG. 8 shows AZ/EL boresight errors in degrees.
Figure 9:
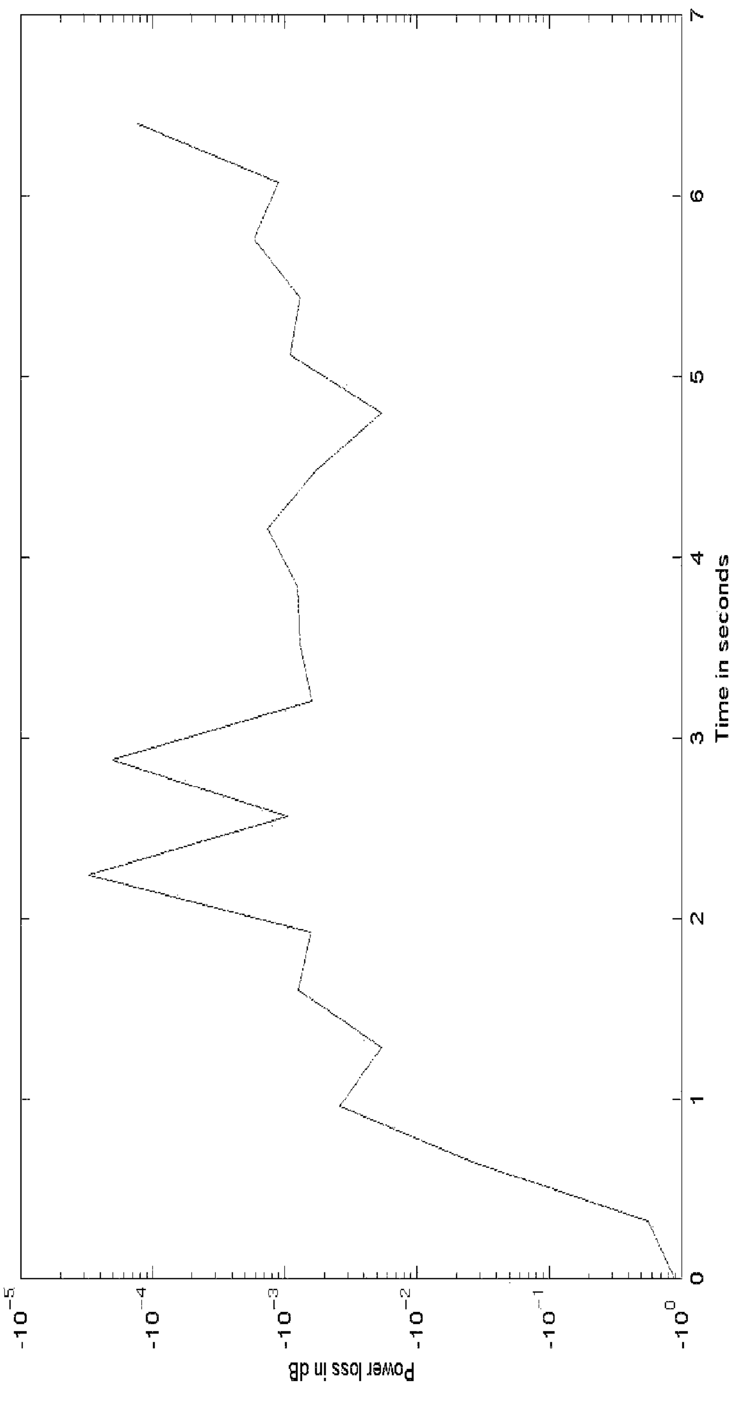
FIG. 9 shows resultant power loss in dB.
Figure 10:
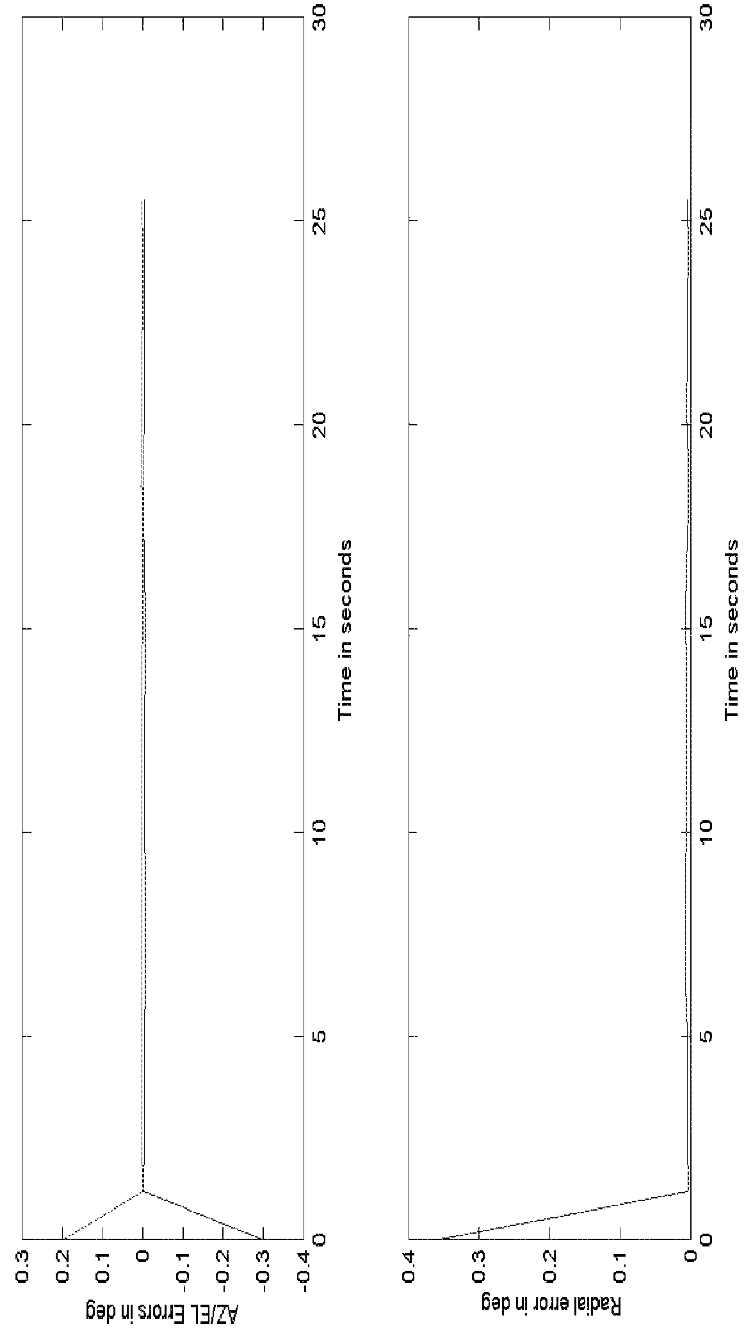
FIG. 10 shows AZ/EL errors (upper plots) and radial error (lower plot) in degrees.
Figure 11:
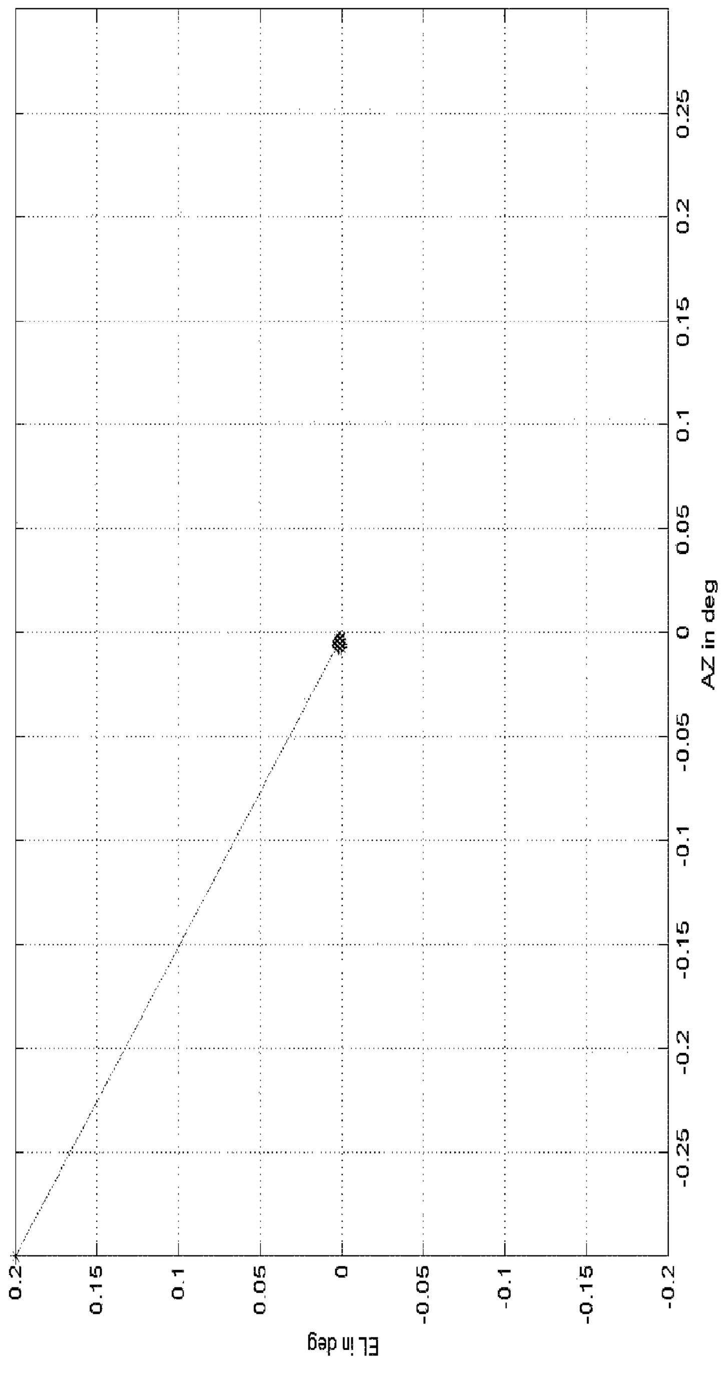
FIG. 11 shows AZ/EL boresight errors in degrees.
Figure 12:
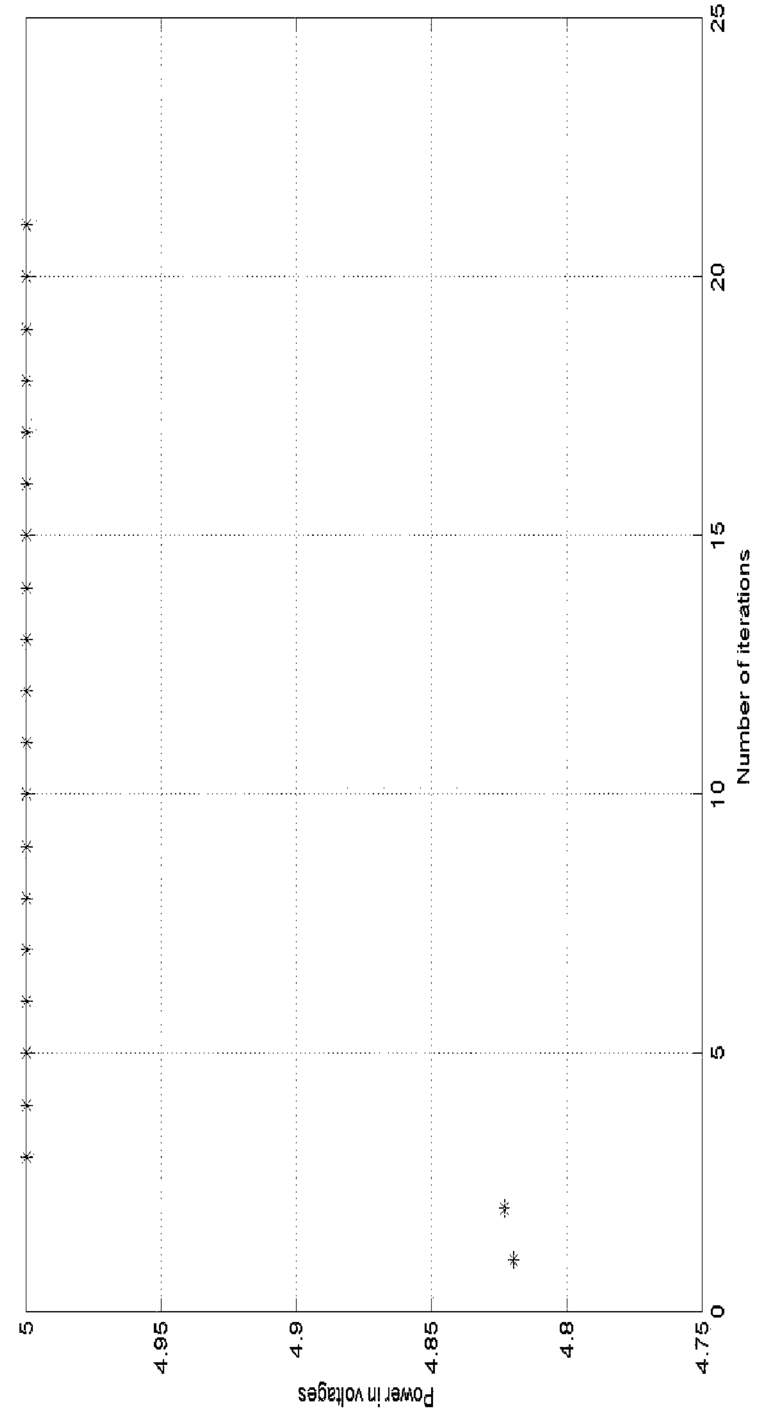
FIG. 12 shows resultant power in watts.
Figure 13:
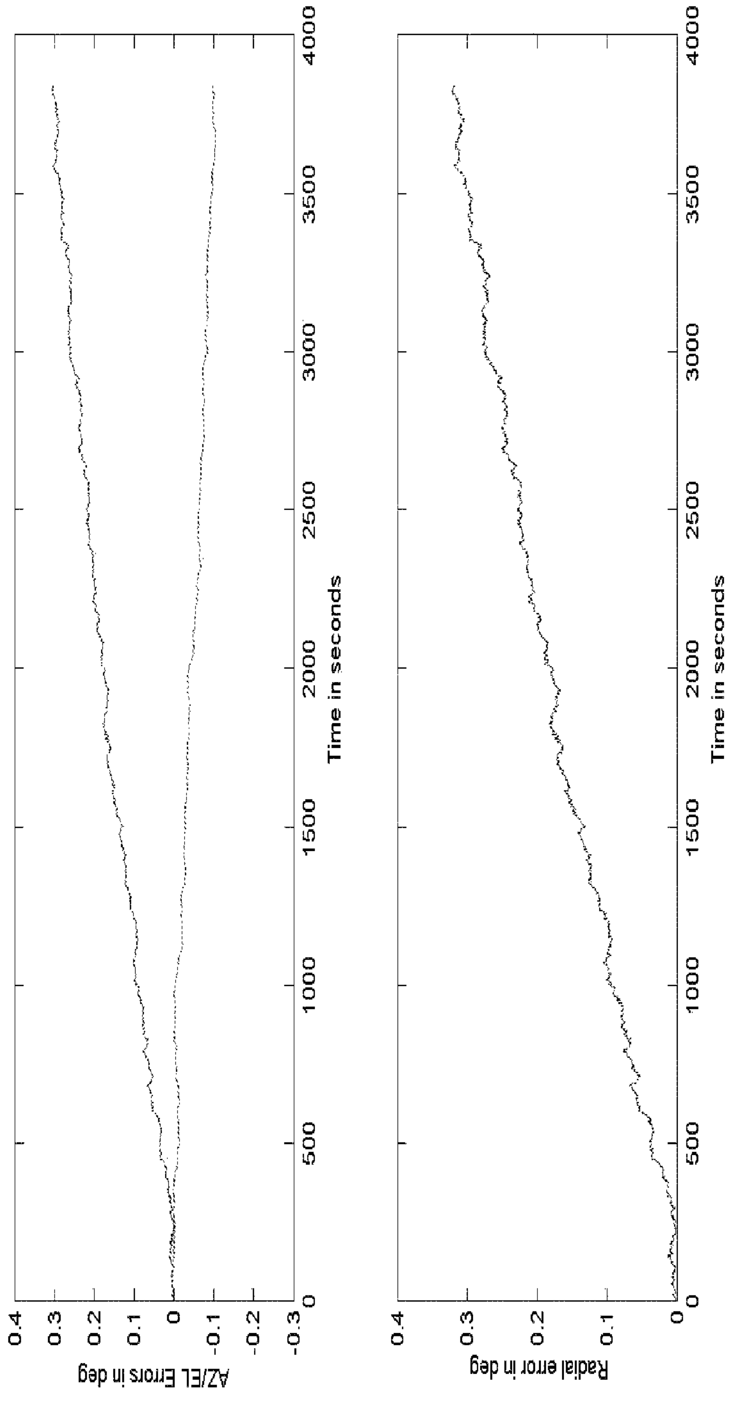
FIG. 13 shows AZ/EL errors (upper plots) and radial error (lower plot) in degrees when the antenna boresight drifts are 0.3 deg/hour in AZ and −0.1 deg/hour in EL; and without using self-scan operation.
Figure 14:
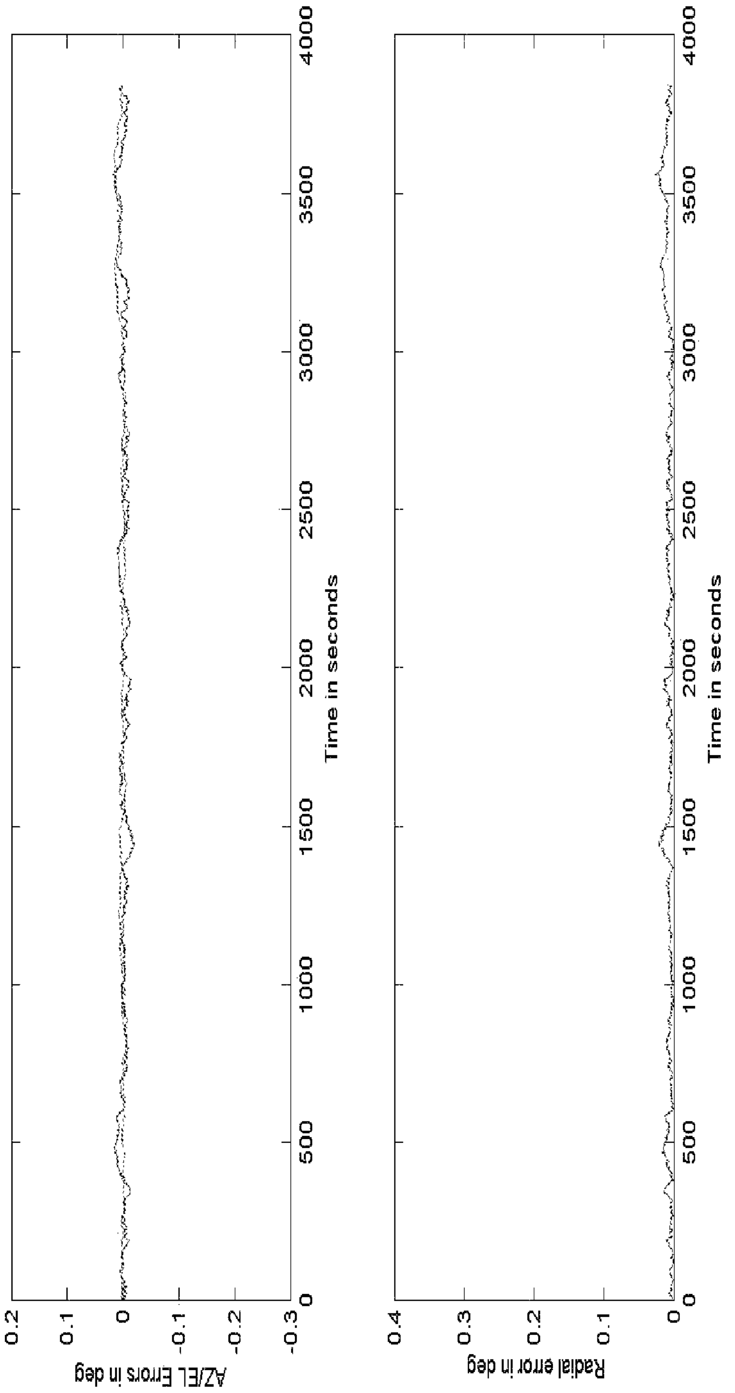
FIG. 14 shows AZ/EL errors (upper plots) and radial error (lower plot) in degrees when the antenna boresight drifts are 0.3 deg/hour in AZ and −0.1 deg/hour in EL while using self-scan operation.
Figure 15:
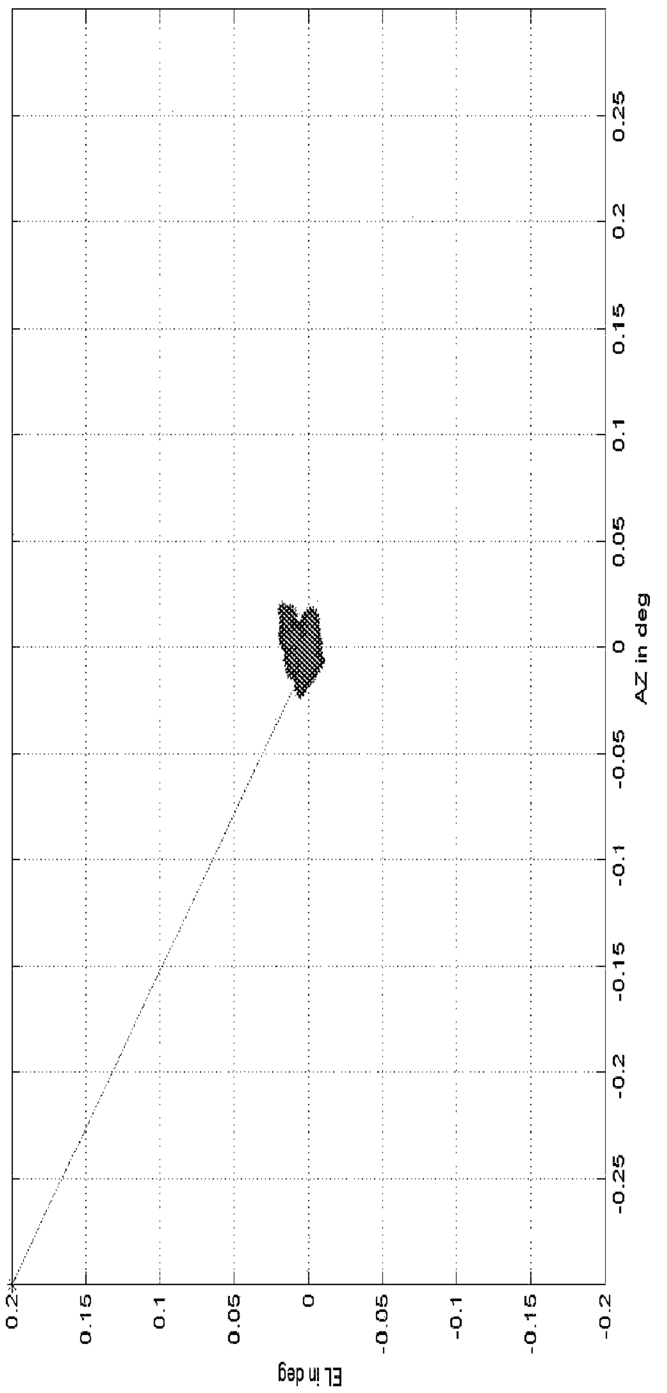
FIG. 15 shows AZ/EL boresight errors in degrees when the antenna boresight drifts are 0.3 deg/hour in AZ and −0.1 deg/hour in EL while not using self scan operation.
Figure 16:
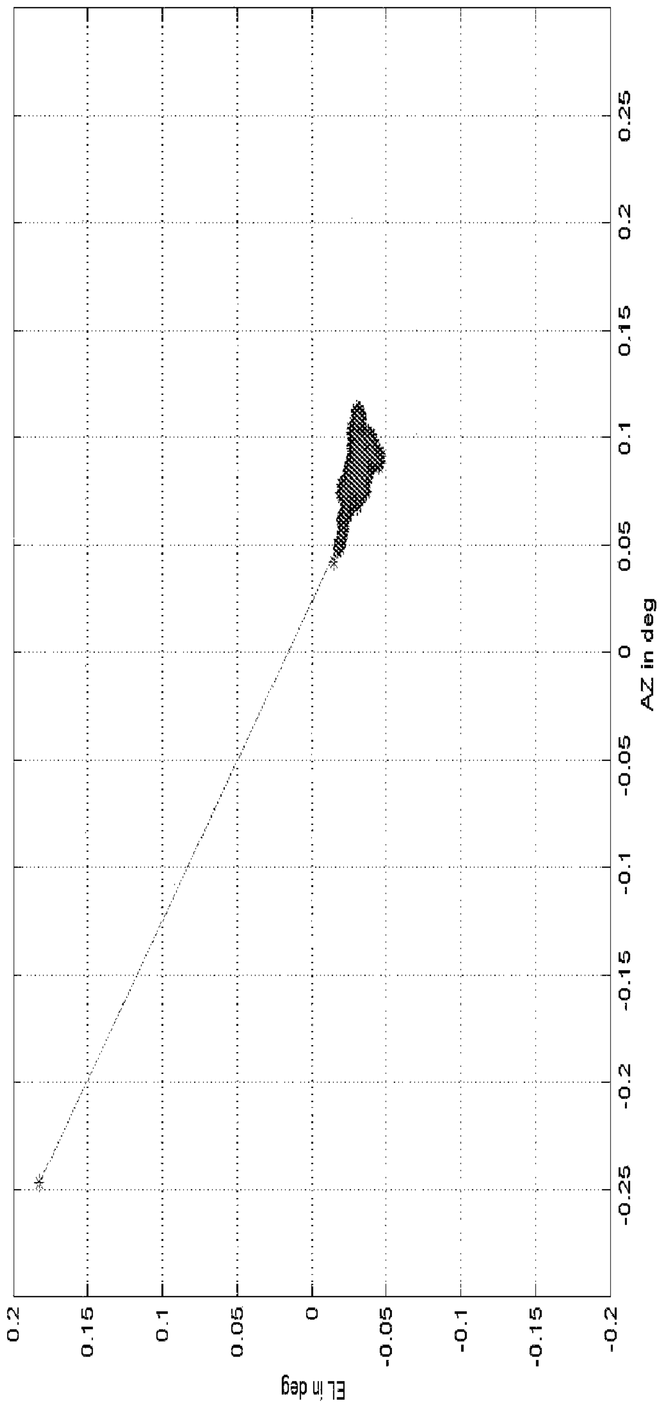
FIG. 16 shows FIG. 7.3-9 AZ/EL boresight errors in degrees when the antenna boresight drifts are 0.3 deg/hour in AZ and −0.1 deg/hour in EL while using self scan operation.

FIGS. 7-9 provide simulation test results for an exemplary antenna using conical scan operations under the following conditions:

Sync hop frequency: 3.125 Hz

Number of samples per sub-reflector revolution: 4

Number of revolutions used to update the AZ/EL errors: 2

Initial AZ_err=−0.3 deg; EL_err=0.2 deg

Sub-reflector angle computation error: 0.01 deg, 3-sigma

Sync hop power measurement noise: 20 dB (=5/100 watts)

Received sync-hopped power variation: +−2 dB (uniformly distributed).

FIGS. 10-16 provide simulation test results for an exemplary airborne antenna with elliptical antenna beam pattern using self scan operations under the following conditions:

Sync hop frequency: 3.125 Hz

Number of samples used before update the AZ/EL errors: 16

Initial AZ_err=−0.3 deg; EL_err=0.2 deg

Sync hop power measurement noise: 20 dB (=5/100 watts)

Received sync-hopped power variation: +−2 dB (uniformly distributed)

Starfish pattern at: AZ=[1.0 −1.0 1.0 −1.0] deg; EL=[1.0 −1.0 −1.0 1.0] deg.

In summary, numerous benefits are described which result from employing the concepts of the invention. The foregoing description of an exemplary preferred embodiment of the invention is presented for the purposes of illustration and description. It is not intended to be exhaustive or to limit the invention to the precise form disclosed. Obvious modifications or variations are possible in light of the above teachings. The embodiment was selected and described in order to best illustrate the principles of the invention and its practical application to thereby enable one of ordinary skill in the art to best utilize the invention in various embodiments and with various modifications as are suited to particular uses contemplated. It is intended that the scope of the invention be defined by the claims appended hereto.

I claim:

1. A method for positioning an antenna having a sub-reflector assembly, the method comprising:

receiving a period of a reference time pulse;

receiving a time tag;

calculating a rotation angle of the sub-reflector assembly using the received period of the reference time pulse and the received time tag;

receiving a power measurement associated with the time tag;

calculating antenna boresight errors using a recursive Kalman filter based on the calculated rotation angle and the received power measurement when an index value is less than or equal to a predetermined number of samples for the Kalman filter, wherein a first set of antenna boresight errors are calculated within a first period of the rotating sub-reflector assembly; and resetting the Kalman filter when the index value is greater than the predetermined number of samples.

2. The method of claim 1, further comprising:

outputting the calculated antenna boresight errors when the index value is greater than the predetermined number of samples.

3. The method of claim 1, wherein the received period for the reference time pulse, time tag, and power measurement are received from a MODEM.

4. The method of claim 1, wherein calculating antenna boresight errors includes calculating a measurement sensitivity matrix based on the calculated rotation angle of the sub-reflector assembly.

5. The method of claim 4, wherein the predetermined number of samples is four.

6. The method of claim 5, wherein the calculated antenna boresight errors are calculated as an azimuth error and an elevation error.

7. The method of claim 1, wherein calculating antenna boresight errors comprises:

calculating a covariance matrix;

calculating a Kalman filter gain matrix;

updating the covariance matrix;

updating one or more state variables; and incrementing the index value.

8. A system for positioning an antenna having a sub-reflector assembly, the system comprising:

a conical scan processor, the processor receives a period for a reference time pulse, a time tag and a power measurement associated with the time tag, the processor calculates a rotation angle of a sub-reflector assembly using the period of the reference time pulse and the time tag, the processor determines whether to (1) recursively calculate a signal representing the antenna boresight azimuth and elevation angle errors as a function of time based on the calculated rotation angle and the received power measurement or (2) reset the Kalman filter and output the signal representing the antenna boresight azimuth and elevation angle errors, the determination based on whether an index value is greater than a predetermined number of samples for the Kalman updates.

9. The system of claim 8, further comprising:

a MODEM in communication with the sub-reflector assembly and the conical scan processor, wherein the MODEM communicates the period of the reference time pulse, the time tag and the power measurement associated with the time tag to the conical scan processor and wherein the MODEM communicates the reference time pulse to the sub-refelector assembly.

10. The system of claim 9, further comprising:

an antenna position control in communication with the conical scan processor, wherein the antenna position control receives the signal representing the antenna boresight errors and positions the antenna in response to the error signals.

11. The system of claim 10, further comprising:

an acquisition and tracking component in communication with both the MODEM and the conical scan processor, wherein the acquisition and tracking component acts as a relay between the MODEM and the conical scan processor.

12. The system of claim 8, further comprising:

an antenna position control in communication with the conical scan processor, wherein the antenna position control receives the signal representing the antenna boresight errors and outputs a signal to position an antenna in response to the error signals.

13. The system of claim 8, wherein the conical scan processor includes a memory and a CPU, wherein the memory includes instructions for causing the CPU to:

calculate the rotation angle of the sub-reflector assembly using the period of the reference time pulse and a time tag; and calculate antenna boresight errors based on the calculated rotation angle of the sub-reflector assembly and on a power measurement associated with the time tag.

14. A device for positioning an antenna having a sub-reflector assembly, the device comprising:

receiving means for receiving a period for a reference time pulse;

receiving means for receiving a time tag;

calculating means for calculating a rotation angle of the sub-reflector assembly using the received period of the reference time pulse and the received time tag;

receiving means for receiving a power measurement associated with the time tag; and calculating means for calculating antenna boresight errors calculated based on the calculated rotation angle of the sub-reflector assembly and the received power measurement associated with the time tag when an index value is less than or equal to a predetermined number of samples for a Kalman update.

15. The device of claim 14, further comprising:

outputting the calculated antenna boresight errors when the index value is greater than the predetermined number of samples.

16. The device of claim 14, wherein the received period of the reference time pulse, time tag, and power measurement are received from a MODEM.

17. The device of claim 14, wherein the calculating means for calculating antenna boresight errors comprises:

calculating means for calculating a measurement sensitivity matrix based on the calculated rotation angle of the sub-reflector assembly; and calculating means for using a recursive Kalman filter to calculate the antenna boresight errors.

18. The device of claim 15, wherein the calculating means for calculating antenna boresight errors further comprises:

resetting means for resetting the Kalman filter when the index value is greater than the predetermined number of samples.

19. The device of claim 18, wherein the calculated antenna boresight errors are calculated as an azimuth error and an elevation error.

20. The device of claim 17, wherein the calculating means for using a recursive Kalman filter to calculate the antenna boresight errors comprises:

calculating means for calculating a covariance matrix;

calculating means for calculating a Kalman filter gain matrix;

updating means for updating the covariance matrix;

updating means for updating one or more state variables; and incrementing means for incrementing the index value.

21. The method of claim 7, wherein updating one or more state variables comprises updating at least three state variables.

* * * * *